United States Patent
Leung

(10) Patent No.: US 7,335,269 B2
(45) Date of Patent: Feb. 26, 2008

(54) PB-FREE SOLDER ALLOY COMPOSITIONS COMPRISING ESSENTIALLY TIN(SN), SILVER(AG), COPPER(CU), AND PHOSPHORUS(P)

(75) Inventor: Wai Yin David Leung, Tuen Mun (HK)

(73) Assignee: Aoki Laboratories Ltd., Hong Kong (HK)

( * ) Notice: Subject to any disclaimer, the term of this patent is extended or adjusted under 35 U.S.C. 154(b) by 0 days.

(21) Appl. No.: 11/362,310

(22) Filed: Feb. 23, 2006

(65) Prior Publication Data
US 2006/0222559 A1    Oct. 5, 2006

(30) Foreign Application Priority Data
Mar. 30, 2005   (CA) .................................... 2502747
Oct. 9, 2005   (CN) ......................... 2005 1 0113441

(51) Int. Cl.
C22C 13/00   (2006.01)
(52) U.S. Cl. ...................... 148/400; 420/560; 420/561
(58) Field of Classification Search ................ 148/400; 420/560–561
See application file for complete search history.

(56) References Cited

FOREIGN PATENT DOCUMENTS

| CN | 1439480 | | 9/2003 |
| EP | 0336575 | * | 10/1989 |
| JP | 2001-071173 | * | 3/2001 |

* cited by examiner

Primary Examiner—Sikyin Ip
(74) Attorney, Agent, or Firm—J.C. Patents

(57) ABSTRACT

A Pb-free solder alloy based on Sn as matrix is provided, which is a metal that has no toxicity and is environmental friendly. The Pb-free solder comprises a tetra-nary composition consisting essentially of about 99.0 weight % Sn, 0.3 to 0.4 weight % Ag, and 0.6 to 0.7 weight % Cu, with off-eutectic melting temperature of 217 to 227 degree Celsius. The fourth component is a non-metallic phosphorus (P), and 0.01 to 1.0 weight % of phosphorus is added into said composition to improve better micro-structural stability and hence reduce the formation of dross when hand soldering, wave soldering and reflow soldering during the electronic assembly installation process.

12 Claims, No Drawings

PB-FREE SOLDER ALLOY COMPOSITIONS COMPRISING ESSENTIALLY TIN(SN), SILVER(AG), COPPER(CU), AND PHOSPHORUS(P)

CROSS-REFERENCE TO RELATED APPLICATIONS

This application claims the priority benefit of Canadian Patent Application No. 2,502,747 filed on Mar. 30, 2005 and of Chinese Invention Patent Application No. 200510113441.3 filed on Oct. 9, 2005. The contents of Canadian Patent Application No. 2,502,747 and Chinese Invention Patent Application No. 200510113441.3 are hereby incorporated by reference in their entirety.

FIELD OF THE INVENTION

Despite Pb is a component of solder alloys in widespread use in the electronic industry, there is a trend to replace the use of Pb metal, because of its toxicity. In addition to the toxicity of Pb, there are other problems concerning continued widespread use of the Sn—Pb and Pb-based solders. In United States, Canada, most of the Europe, and in Japan, the use of Pb in all commercial products, such as: vehicles, electronic toys, computers and appliance, shall all be banned.

BACKGROUND OF THE INVENTION

The excellent metallurgical wetting of 63% Sn and 37% Pb is thought to be promoted by the instantaneous formation of a thin layer of a very stable intermetallic compound at the molten solder interface. The interfacial intermetallic compound that aids solder wetting is always based on Sn, not Pb. The role of Pb in promoting solderability is much less understood, but seems related to its ability to strongly suppress the liquid surface tension of solder alloy, lowering the contact angel of the molten solder which leads to better spreading and more interacting surface area for the solder joint to form. The eutectic solidification reaction of 63% Sn and 37% Pb also generates a highly refined mixture of Sn and Pb phase that can produce unusual strength from rather weak constituents.

In response to the possibility of a governmental ban or excessive taxation of Pb used, manufactures and users of Pb-bearing solder for electronic and circuit joining application recently have attempted to develop Pb-free solders as direct replacements for the conventional Sn—Pb solders in conventional hand/wave/reflow soldering processes employing general heating of an electronic wiring board to temperatures of 240 to 250 degree Celsius. Moreover, there is a need for such a solder that would be competitive in cost and as readily available as conventional Sn—Pb eutectic solders for high volume use.

A ternary, off-eutectic Sn—Ag—Cu solder alloy has been developed by the plumbing industry as a Pb-free solder with 96 weight % Sn, 3.5 weight % Cu, and 0.5 weight % Ag. This plumbing solder has a solidus temperature of 227 degree Celsius and a liquidus temperature of 260 degree Celsius, which would be considered not suitable for electronics manufacturers (U.S. Pat. No. 5,527,625, Anderson et al. Jun. 18, 1996).

Recent developments of Pb-free solder alloys mainly involve the use of Ag, Bi, Cu, In, Sn and Zn. Special attentions have been drawn on the solder composition comprising Sn, Ag, and Cu. Anderson et. al. of Iowa State University Research have reported the eutectic Pb-free solder comprising 93.6Sn/4.7Ag/1.7Cu and Sn/Ag/Cu/Ni/Fe, respectively (U.S. Pat. No. 5,527,625, Anderson et al. Jun. 18, 1996). As the solder based on the Sn—Ag—Cu system, Anderson et al. have provided a Pb-free solder comprising 93.6Sn/4.7Ag/1.7Cu, which is more excellent than other Pb-free solder in welding performance of metal, conductivity, mechanical property, pliability and so on, but has a poorer wetting property, and a coarse alloy structure, as a result, it's distribution is not easy to be even. On the other hand, since the content of Ag is high up to 4.7 weight % in the Pb-free solder based on the Sn—Ag—Cu system, the silver will be reacted with components of the soldering flux, which contain halogen, to produce silver bromide, silver chloride, silver fluoride, or silver carbonate during its application. After such silver compounds are exposed to light, a phenomenon of changing to black occurs, as a result, the final products concerned the Pb-free solder are trend to change to black. In addition, Hu Jianxiong et al. have reported that chemical molecules of P, which has non-metal property, will penetrate into the structure of metal molecule of Pb-free solder under P are molten, thereby to improve better micro-structural stability and hence reduce the formation of dross (State Intellectual Property Office of People's Republic of China: ZI Patent No. 03110895.4, Hu Jianxiong et al., Jan. 15, 2003).

It is therefore an object of the present invention to provide a new and improved composition of an environmental friendly Pb-free solder alloy that has all of the advantages of prior art and yet keep our environment green.

It is another object of the present invention to provide a new and improved composition of an environmental friendly Pb-free solder alloy that may be efficiently manufactured and marketed.

An even further object of the present invention is to provide a new and improved composition of an environmental friendly Pb-free solder alloy that is susceptible of a low cost of manufacture with regard to both materials and labor, and which accordingly is then susceptible of low prices of sale to the consuming public, thereby making such composition available to the buying public.

Still yet a further object of the present invention is to provide a new and improved composition of an environmental friendly Pb-free solder alloy which can be used to make Pb-free solder bar, wire, BGA ball and anode in electronics industries.

These together with still other objects of the invention, along with the various features of novelty that characterize the invention, are pointed out with particularity in the claims forming a part of this disclosure. For a better understanding of the invention, its operating advantages and the specific objects attained by its uses, reference should be made to the following detailed description of the preferred examples of the invention.

SUMMARY OF THE INVENTION

This present invention provides a Pb-free solder comprising a tetra-nary composition consisting essentially of Sn, Ag, Cu, and P, having a melting temperature of 217 to 227 degree Celsius.

Specially, this present invention provides an electrical conductor pb-free solder composition, which consists essentially of about 0.3 to 0.4 weight % Ag, 0.6 to 0.7 weight % Cu, not more than 1.0 weight % P, balance Sn and unavoidable impurities, based on the weight of the composition. The purpose of adding P is to improve better micro-structural stability and hence reduce the formation of dross (the unavoidable impurities include Cd, Hg, In, Bi, Zn, Al, Fe, As, Ba, Ni, Sb, Se, Cr, and so on, each content of which is not more than 0.01%).

In one embodiment of the invention, the electrical conductor Pb-free solder composition consists essentially of 0.3 weight % Ag, 0.7 weight % Cu, 0.01 to 1.0 weight % P, balance Sn and unavoidable impurities, based on the weight of composition. The melting temperature of the solder is in the range of 217 to 227 degree Celsius. The purpose of adding 0.01 to 1.0 weight % of P is to improve better micro-structural stability and hence reduce dross of the solder composition.

In another embodiment of the invention, the electrical conductor Pb-free solder composition consists essentially of 0.4 weight % Ag, 0.6 weight % Cu, 0.01 to 1.0 weight % P, balance Sn and unavoidable impurities, based on the weight of the composition. The melting temperature of the solder is in the range of 217 to 227 degree Celsius. The purpose of adding 0.01 to 1.0 weight % of P is to improve better micro-structural stability and hence reduce dross of the solder composition.

The solder of the invention described above can be used as a replacement for Pb-containing solders in solder wave, reflow and other hand soldering processes in widespread used in the electronic and other industries.

The solder of the invention is advantageous not only from an environmental standpoint but also from the cost and availability standpoint in that the alloy compounds (Sn, Ag, Cu and P) are readily available at lower cost than the Pb-free solders including large amount of Bi, In, Zn, or Ga proposed to-date. Large volume solder applications especially will benefit from the low cost, high performance solder of the invention having the aforementioned advantages not possesses heretofore by other Pb-free solders.

EMBODIMENTS

The Pb-free solder composition of the present invention is based on a tetra-nary composition consisting essentially of about 0.3 to 0.4 weight % Ag, 0.6 to 0.7 weight % Cu, not more than 1.0 weight % P, balance Sn. In addition, the purpose of adding P is to improve better micro-structural stability and hence reduce the formation of dross.

Preferably, for electronic solder applications using the solder wave process, the melting temperature range of the solder should not exceed 10 degree Celsius. The solder melting range of the solder of the present invention is within 10 degree Celsius.

A preferred Pb-free solder of the invention is listed below, exhibiting off-eutectic melting temperatures:

(1). A electrical conductor Pb-free solder composition consisting essentially of 0.3 weight % Ag, 0.7 weight % Cu, 0.01 to 1.0 weight % P, balance Sn and unavoidable impurities, based on the weight of composition. The melting temperature of the solder is in the range of 217 to 227 degree Celsius.

(2). A electrical conductor Pb-free solder composition consisting essentially of 0.4 weight % Ag, 0.6 weight % Cu, 0.01 to 1.0 weight % P, balance Sn and unavoidable impurities, based on the weight of composition. The melting temperature of the solder is in the range of 217 to 227 degree Celsius.

The Pb-free solder of the present invention includes at least one non-metallic component consisting essentially of P, in an amount not exceeding 1 weight %.

The Pb-free solder of the present invention, which comprises Sn/(0.3-0.4)Ag/(0.6-0.7)Cu/(not exceeding 1.0)P, is similar as the conventional Pb-free solder comprising Sn/3.0Ag/0.5Cu in welding performance, conductivity, mechanical property, pliability and so on. But since the content of Ag of the Pb-free solder of the present invention is about one-tenth of other Pb-free solder comprising Sn/3.0Ag/0.5Cu (Ag is trend to react with chemical agents, such as acid or alkali and so on, thereby to produce noxious substance), so the Pb-free solder of the present invention is more safe, and has no adverse effect to living beings and environments in potential. In addition, the content of Ag [less than 0.5%] of the Pb-free solder of the present invention, which comprises Sn/(0.3-0.4)Ag/(0.6-0.7)Cu/(not exceeding 1.0)P, is less than that of conventional Pb-free SnAgCu solder, so the silver compounds which are generated in the reaction between silver and halogen component of the soldering flux, are not easy to form, as a result, the phenomenon of changing to black is slight.

The method for preparing 500 Kg of the Pb-free solder of the present invention is shown below:

1. 3.5 Kg of pure copper and 200 Kg of pure tin are added into a steel kettle, then heated to the temperature of 400 degree Celsius, and stirred for about 45 minutes;

2. The resulting mixture is cooled to the temperature of 300 degree Celsius, then 294.75 Kg pure tin is added into the steel kettle and stirred for about 45 minutes;

3. 1.5 Kg of pure silver is added into the steel kettle, then heated to the temperature of 370 degree Celsius, and stirred for about 45 minutes;

4. 250 g P is pulverized and added into the steel kettle and stirred for about 45 minutes at the temperature of 370 degree Celsius.

The solder of the present invention can be provided in many forms as needed for particular solder applications. The solder of the present invention can be provided as solder wire, solder bar, solder ingot, and solder powder. The solder bar and ingot can be manufactured by convention solder smelting technique. The smelting solder should be stirred 360±30 degree Celsius for 45 minutes, then let drop to 300 degree Celsius. The solder the can be chilled cast, from 300 degree Celsius to 65±10 degree Celsius, into suitable steel molds to produce bars or ingots having high purity and compositional accuracy. The solder wire can be extruded from ingot into hollow wire, which is then filled with core flux.

The above brief description sets forth rather broadly the more important features of the present invention in order that the detailed description thereof that follows may be better understood, and in order that the present contributions to the art may be better appreciated. There are, of course, additional features of the invention that will be described hereinafter and will form the subject matter of the claims appended hereto.

In this respect, before explaining the preferred examples of the invention in detail, it is to be understood that the invention is not limited in its application to the details of the construction and to the arrangements of the components set forth in the following description. The invention is capable of other embodiments and of being practiced and carried out in various ways. Also, it is to be understood, that the phraseology and terminology employed herein are for the purpose of description and should not be regarded as limiting.

It is an object of the present invention to provide a Pb-free solder alloy, which can improve better micro-structural stability and hence reduce the formation of dross. Furthermore, the surface of soldering tin is not trend to change black, so the amount of metal oxide produced on the steel kettle of solder can reduced, and the defective fraction rate can be reduced during electro wiring board soldering.

EXAMPLE 1

The Pb-free solder of this example consists of the following components, based on the weight %: 0.3 weight % Ag, 0.7 weight % Cu, 0.05 weight % P, and balance Sn.

EXAMPLE 2

The Pb-free solder of this example consists of the following components, based on the weight %: 0.4 weight % Ag, 0.6 weight % Cu, 0.05 weight % P, and balance Sn.

The raw materials, weights thereof, processing steps and processing conditions for preparing the Pb-free solder have been described in detail in foregoing paragraphs. Now, the example 1 and 2 are listed in table 1. [see table 1]

TABLE 1

|  | Pure tin | Pure silver | Pure copper | | Melting temperature | |
|---|---|---|---|---|---|---|
|  | Sn | Ag | Cu | Phosphorus P | Solidus | Liquidus |
| Example 1 | 494.75 Kg (98.95%) | 1.5 Kg (0.3%) | 3.5 Kg (0.7%) | 0.25 Kg (0.05%) | 217° C. | 227° C. |
| Example 2 | 494.75 Kg (98.95%) | 2.0 Kg (0.4%) | 3.0 Kg (0.6%) | 0.25 Kg (0.05%) | 217° C. | 227° C. |

Now, the melting points of the conventional Pb-free solder (3.5 weight % Ag, 0.7 weight % Cu, and 95.8 weight % Sn) and the Pb-free solder of the example 1 and 2 described above, and the comparisons of appearance inspection thereof are shown in table 2. [see table 2]

TABLE 2

The comparisons of appearance of the Pb-free solder of the examples of the present invention and the conventional Pb-free solder comprising SnAgCu.

|  | Metal component of Pb-free solder (weight %) | | | | Melting temperature (° C.) | | After contacting soldering flux comprising 0.05% halogen for 30 min |
|---|---|---|---|---|---|---|---|
|  | Sn | Ag | Cu | P | Solidus | Liquidus | Not change to black |
| Example 1 | Balance | 0.3 | 0.7 | 0.05 | 217 | 227 | Not change to black |
| Example 2 | balance | 0.4 | 0.6 | 0.05 | 217 | 227 | Not change to black |
| Conventional Pb-free solder | 95.8 | 3.5 | 0.7 | NIL | 217 | 227 | Change to black |

In order to inspect the influence of soldering flux comprising halogen (0.05%) to the Pb-free solder of the examples of the present invention and the conventional Pb-free solder comprising SnAgCu, the test is performed to inspect the appearance of soldering tin points of the Pb-free solder alloy of examples of the present invention and the conventional Pb-free solder alloy, i.e. 0.05 ml soldering flux comprising 0.05% halogen is added to the soldering tin points, after 30 min, the appearance of soldering tin points is inspected by visual, and the results are shown in table 2. From the table 2, it is found that the soldering tin points of examples have less influence of changing to black for the soldering flux comprising halogen, when the content of Ag is small (0.3 to 0.4 weight %), and the soldering tin points change to black, when the content of Ag is up to 3.5 weight %.

TABLE 3

The comparisons of oxidation resistance of the Pb-free solder of the example of the present invention and the conventional Pb-free solder comprising SnAgCu.

|  | Initial weight (Kg) | Remainder weight (Kg) | Burning loss (Kg) | Rate of burning loss (%) | Time of holding temperature (hour) | Holding temperature (° C.) |
|---|---|---|---|---|---|---|
| Example 1 | 100.0 | 99.70 | 0.30 | 0.30 | 10 | 280 |
| Example 2 | 100.0 | 99.71 | 0.29 | 0.29 | 10 | 280 |
| Conventional Pb-free solder | 100.0 | 98.00 | 2.00 | 2.00 | 10 | 280 |

In addition, the test is performed to measure the oxidation resistance of the Pb-free solder of examples of the present invention and the conventional Pb-free solder, i.e. the solders are hold at a temperature of 280 degree Celsius for 10 hours, then measured the rate of burning loss thereof, and the results are shown in table 3.

From the test of table 3, it is found that the rates of burning loss of the Pb-free solder of examples 1 and 2, to which (0.01 to 1.0 weight %) P is added, are in the range of one-sixth to one-seventh of the rate of burning loss of the conventional Pb-free solder. The results show that the oxidation resistance of the Pb-free solder alloy to which (0.01 to 1.0 weight %) P is added is better than that of the conventional Pb-free solder having formulation of 3.5 weight % Ag, 0.7 weight % Cu, and 95.8 weight % Sn.

As such, those skilled in the art will appreciate that the conception, upon which this disclose is based, may readily be utilized as a basis for designing other structures, methods and systems for carrying out the several purposes of the present invention. It is important, therefore, that the claims be regarded as including such equivalent constructions insofar as they do not depart from the spirit and scope of the present invention. And the abstract of the present invention is just an abstract, not intended to be limiting as to the scope of the invention in any way.

The invention claimed is:

1. A Pb-free electrical conductor solder composition consisting of about 0.3 to 0.4 weight % Ag, 0.6 to 0.7 weight % Cu, not more than 1.0 weight % P, balance Sn and unavoidable impurities, based on the weight of composition.

2. The Pb-free electrical conductor solder composition of claim 1 consisting of 0.3 weight % Ag, 0.7 weight % Cu, 0.01 to 1.0 weight % P, balance Sn and unavoidable impurities, based on the weight of composition, with melting temperature of 217 to 227 degree Celsius.

3. The Pb-free electrical conductor solder composition of claim 1 consisting of about 0.4 weight % Ag, about 0.6 weight % Cu, 0.01 to 1.0 weight % P, balance Sn and unavoidable impurities, based on the weight of composition, with off-eutectic melting temperature of 217 to 227 degree Celsius.

4. The Pb-free electrical conductor solder composition of claim 1, wherein the content of P is less than 0.8 weight %.

5. The Pb-free electrical conductor solder composition of claim 2, wherein the content of P is less than 0.8 weight %.

6. The Pb-free electrical conductor solder composition of claim 3, wherein the content of P is less than 0.8 weight %.

7. The Pb-free electrical conductor solder composition of claim 1, wherein the content of P is in the range of 0.01 to 0.5 weight %.

8. The Pb-free electrical conductor solder composition of claim 2, wherein the content of P is in the range of 0.01 to 0.5 weight %.

9. The Pb-free electrical conductor solder composition of claim 3, wherein the content of P is in the range of 0.01 to 0.5 weight %.

10. The Pb-free electrical conductor solder composition of claim 1, wherein the content of P is in the range of 0.05 to 0.5 weight %.

11. The Pb-free electrical conductor solder composition of claim 2, wherein the content of P is in the range of 0.05 to 0.5 weight %.

12. The Pb-free electrical conductor solder composition of claim 3, wherein the content of P is in the range of 0.05 to 0.5 weight %.

* * * * *

(12) EX PARTE REEXAMINATION CERTIFICATE (9501st)
United States Patent
Leung

(10) Number: US 7,335,269 C1
(45) Certificate Issued: Jan. 30, 2013

(54) PB-FREE SOLDER ALLOY COMPOSITIONS COMPRISING ESSENTIALLY TIN(SN), SILVER(AG), COPPER(CU), AND PHOSPHORUS(P)

(75) Inventor: Wai Yin David Leung, Tuen Mun (HK)

(73) Assignee: Aoki Laboratories Ltd., Tuen Mun, N.T. (HK)

Reexamination Request:
No. 90/011,019, Jul. 29, 2010

Reexamination Certificate for:
Patent No.: 7,335,269
Issued: Feb. 26, 2008
Appl. No.: 11/362,310
Filed: Feb. 23, 2006

(30) Foreign Application Priority Data

Mar. 30, 2005 (CA) .................................... 2502747
Oct. 9, 2005 (CN) .......................... 2005 1 0133441

(51) Int. Cl.
*C22C 13/00* (2006.01)

(52) U.S. Cl. ......................... 148/400; 420/560; 420/561

(58) Field of Classification Search ................... 148/400
See application file for complete search history.

(56) References Cited

To view the complete listing of prior art documents cited during the proceeding for Reexamination Control Number 90/011,019, please refer to the USPTO's public Patent Application Information Retrieval (PAIR) system under the Display References tab.

*Primary Examiner* — Carlos N. Lopez

(57) ABSTRACT

A Pb-free solder alloy based on Sn as matrix is provided, which is a metal that has no toxicity and is environmental friendly. The Pb-free solder comprises a tetra-nary composition consisting essentially of about 99.0 weight % Sn, 0.3 to 0.4 weight % Ag, and 0.6 to 0.7 weight % Cu, with off-eutectic melting temperature of 217 to 227 degree Celsius. The fourth component is a non-metallic phosphorus (P), and 0.01 to 1.0 weight % of phosphorus is added into said composition to improve better micro-structural stability and hence reduce the formation of dross when hand soldering, wave soldering and reflow soldering during the electronic assembly installation process.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*